US012767115B2

(12) United States Patent
Segura Gutierrez

(10) Patent No.: US 12,767,115 B2
(45) Date of Patent: Oct. 20, 2026

(54) METHOD FOR INTEGRATING AN ELECTRIC DRIVE SYSTEM IN A VEHICLE WITH AN INTERNAL COMBUSTION ENGINE DRIVE SYSTEM USING THE GEARBOX TO CONVERT IT INTO A HYBRID VEHICLE

(71) Applicant: Salvador Segura Gutierrez, Mexico City (MX)

(72) Inventor: Salvador Segura Gutierrez, Mexico City (MX)

( * ) Notice: Subject to any disclaimer, the term of this patent is extended or adjusted under 35 U.S.C. 154(b) by 293 days.

(21) Appl. No.: 18/694,437

(22) PCT Filed: Sep. 22, 2022

(86) PCT No.: PCT/MX2022/050082
§ 371 (c)(1),
(2) Date: Mar. 22, 2024

(87) PCT Pub. No.: WO2023/048555
PCT Pub. Date: Mar. 30, 2023

(65) Prior Publication Data

US 2024/0383466 A1 Nov. 21, 2024

(30) Foreign Application Priority Data

Sep. 22, 2021 (MX) .................... MX/a/2021/011569

(51) Int. Cl.
*B60W 10/26* (2006.01)
*B60W 20/40* (2016.01)

(52) U.S. Cl.
CPC ............ *B60W 10/26* (2013.01); *B60W 20/40* (2013.01); *B60W 2540/10* (2013.01)

(58) Field of Classification Search
CPC .. B60K 6/50; B60K 6/485; B60K 2006/4816; B60K 6/00; B60K 6/22; B60K 6/383;
(Continued)

(56) References Cited

U.S. PATENT DOCUMENTS 3,910,651 A * 10/1975 Pearce .................... F16C 33/80 60/39.08
4,893,779 A * 1/1990 Bergelt ................ B60K 5/1283 248/913
(Continued)

FOREIGN PATENT DOCUMENTS

CA 2810408 C 12/2017
CN 204263947 U * 4/2015
(Continued)

OTHER PUBLICATIONS

English translation of DE102016203571A1 (Year: 2017).*
English translation of DE102009001149A1 (Year: 2010).*
English translation of CN204263947U (Year: 2015).*

*Primary Examiner* — James A Shriver, II
*Assistant Examiner* — Mohammad Omid Neyzari
(74) *Attorney, Agent, or Firm* — Jose Cherson Weissbrot

(57) ABSTRACT

The present invention relates to the integration of an electric propulsion system into vehicles with an internal combustion engine propulsion system to convert them into hybrid vehicles. The electric propulsion system can be integrated through two mechanical elements contained in the gearbox, the intermediate shaft or countershaft and the output shaft, to adapt a pulley or gear system driven by an electric motor.

29 Claims, 9 Drawing Sheets

(58) Field of Classification Search
CPC ............ B60K 6/387; B60K 2006/4808; B60K 2006/4833; B60K 6/48; B60K 5/1283; B60W 10/26; B60W 10/00; B60W 10/023; B60W 2540/10; B60W 20/40; Y02T 10/62
See application file for complete search history.

(56) References Cited

U.S. PATENT DOCUMENTS

| | | | | |
|---|---|---|---|---|
| 5,562,565 | A * | 10/1996 | Moroto | B60K 6/365 903/952 |
| 6,332,257 | B1 * | 12/2001 | Reed, Jr. | B60L 15/2009 903/952 |
| 8,992,363 | B2 | 3/2015 | Torrelli | |
| 2006/0030450 | A1 * | 2/2006 | Kyle | B60L 50/16 477/3 |
| 2009/0000836 | A1 * | 1/2009 | Kydd | B60K 6/485 180/65.6 |
| 2011/0031051 | A1 * | 2/2011 | George | B60L 50/16 29/596 |
| 2011/0083309 | A1 * | 4/2011 | Kshatriya | B60K 11/06 903/903 |
| 2017/0029054 | A1 * | 2/2017 | Woodward | B60K 6/485 |
| 2017/0246944 | A1 | 8/2017 | Goleski et al. | |
| 2018/0015816 | A1 | 1/2018 | Robinette et al. | |

FOREIGN PATENT DOCUMENTS

| | | | | |
|---|---|---|---|---|
| DE | 102009001149 | A1 * | 8/2010 | B60K 6/48 |
| DE | 102016203571 | A1 * | 9/2017 | B60W 50/16 |
| IN | 2613/MUM/2015 | A | 4/2017 | |
| MX | 2020001955 | A | 8/2021 | |
| WO | WO-2020183492 | A1 * | 9/2020 | B60K 6/26 |

* cited by examiner

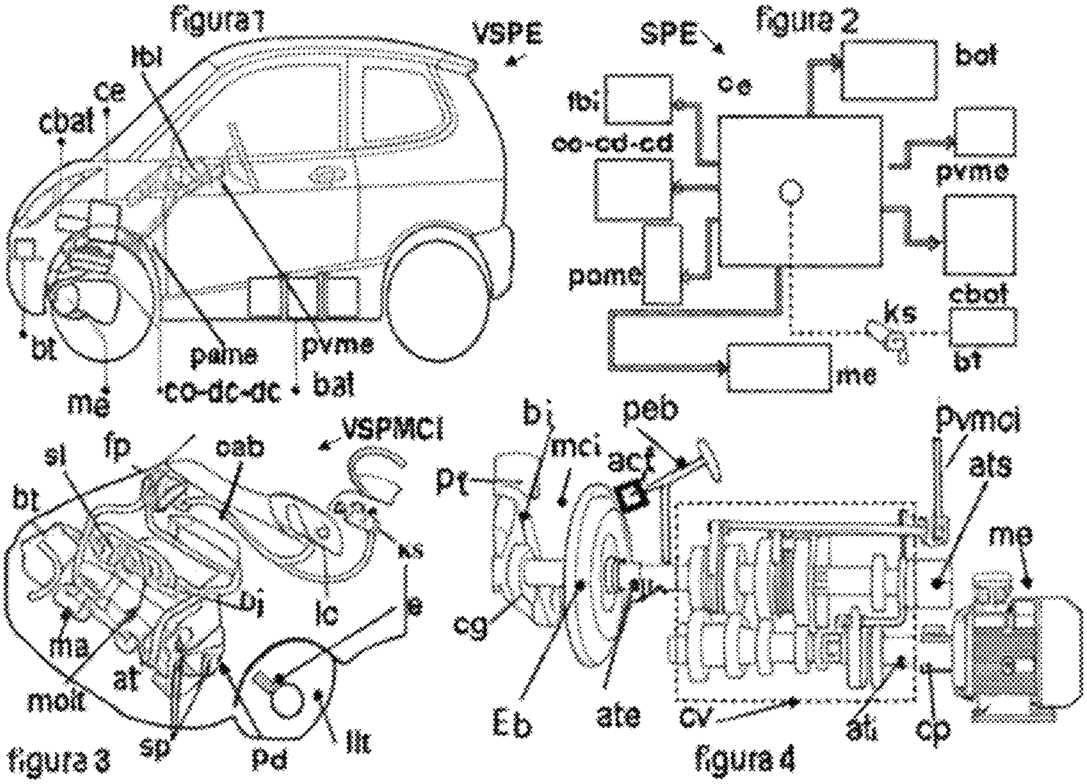
figura1
VSPE
fbi
ce
cbat
bt
me
paine
co-dc-dc
pvme
bat
SPE
figura 2
bat
ce
fbi
co-cd-cd
pvme
pome
cbat
ks
bt
me
VSPMCI
sl
fp
cab
bt
bi
ks
lc
ma
moit
at
sp
pd
llt
figura 3
bi
peb
mci
act
pt
Pvmci
ats
me
cg
Eb
ate
cv
ati
cp
figura 4 figura 5
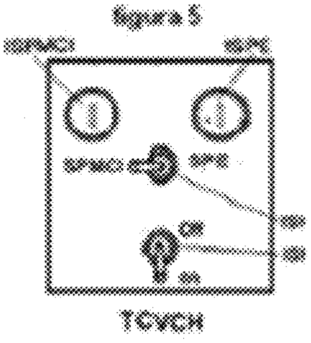
figura 6
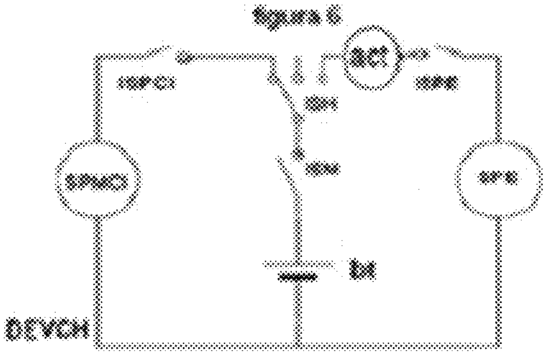
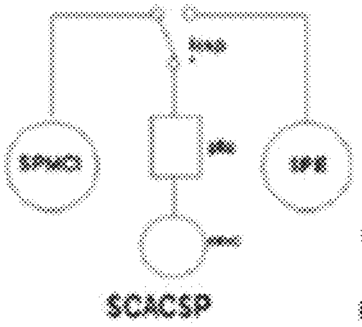
figura 7
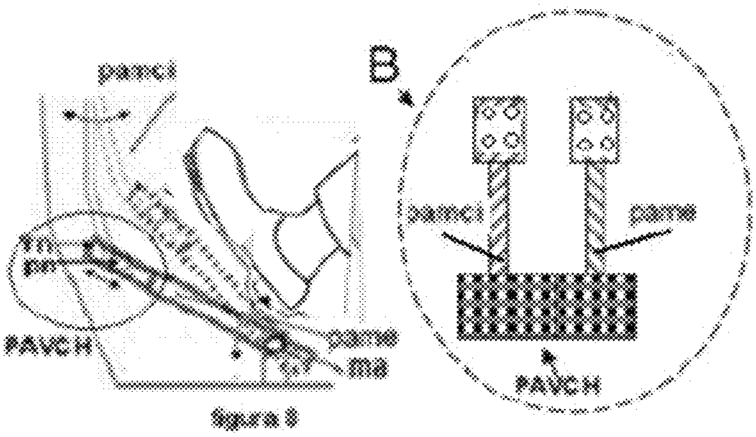
figura 8 figura 9
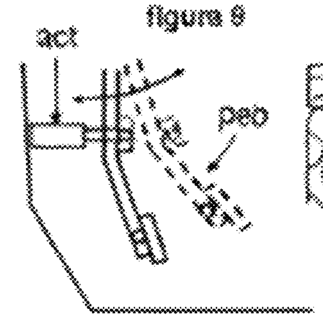
figura10
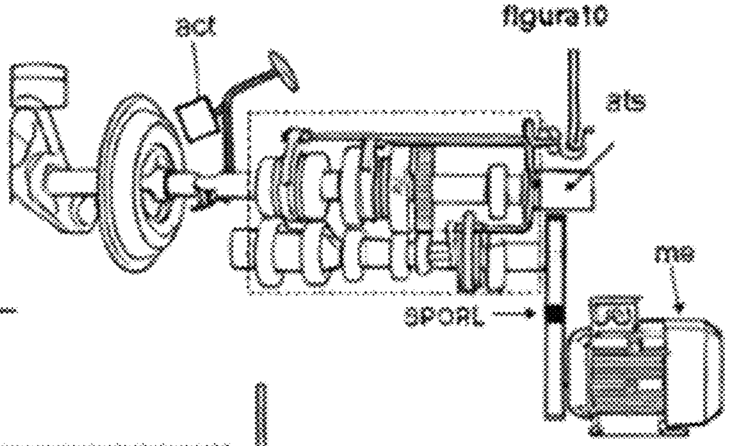
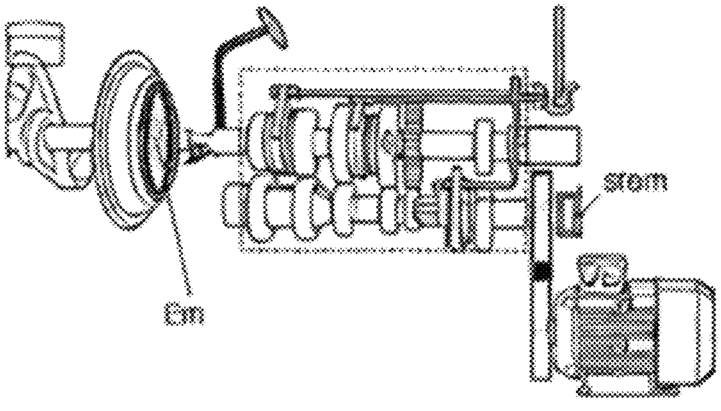
figura11

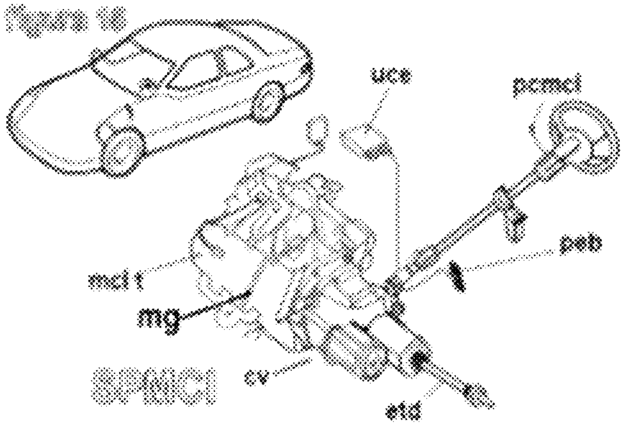
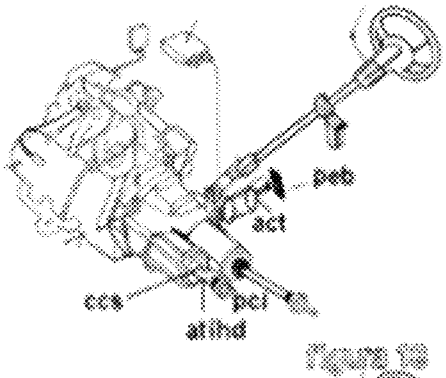
figura 17
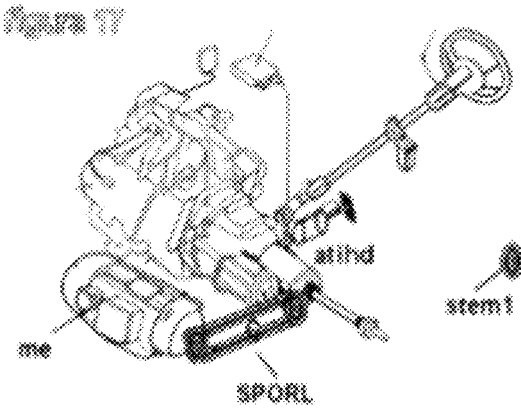
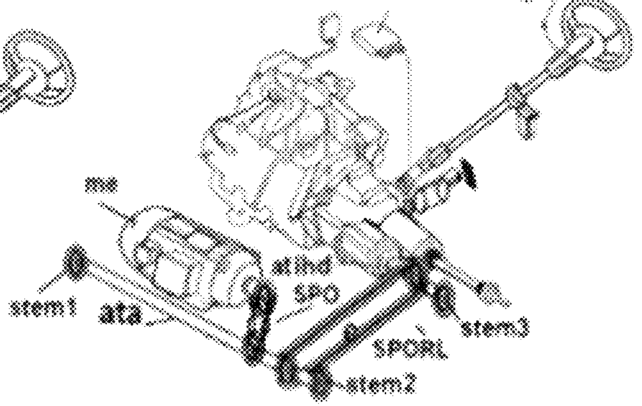

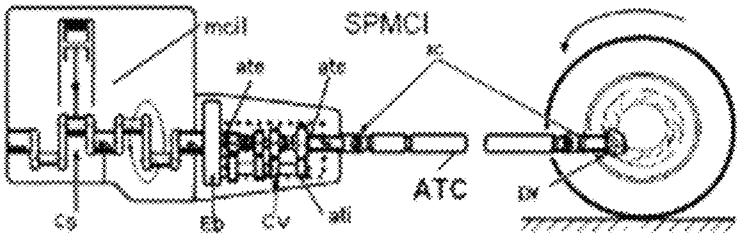
Figure 19
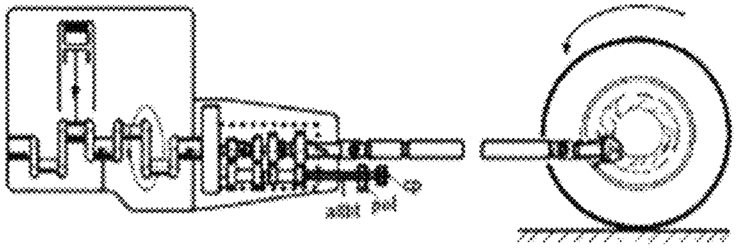
Figure 20
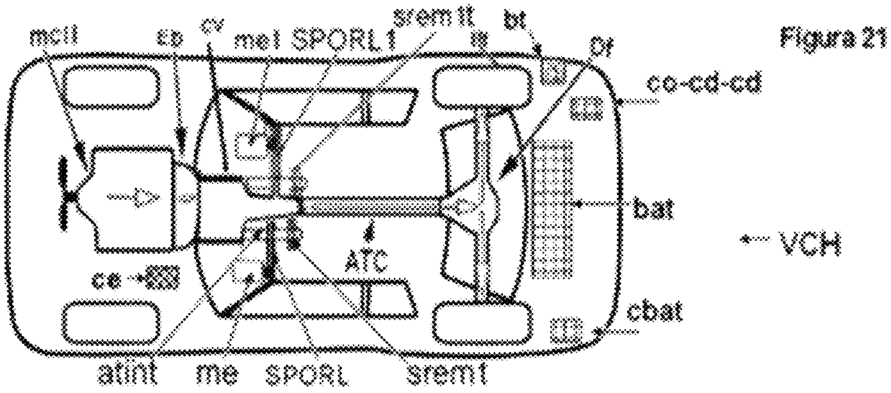
Figura 21

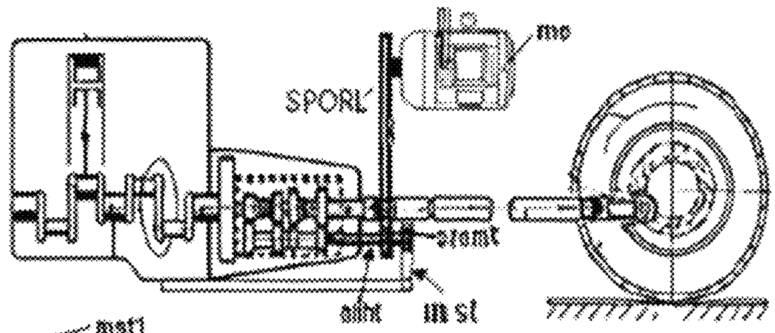
Figura 22
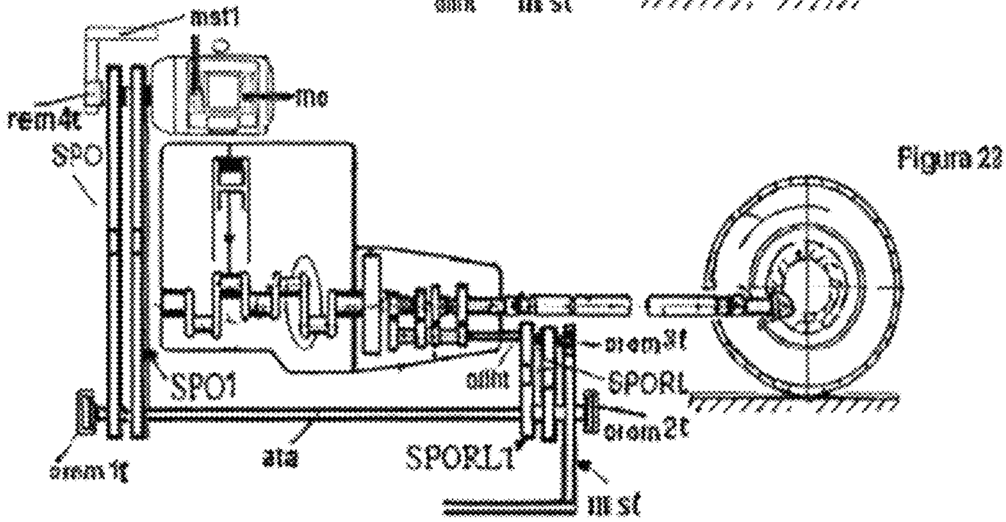
Figura 22

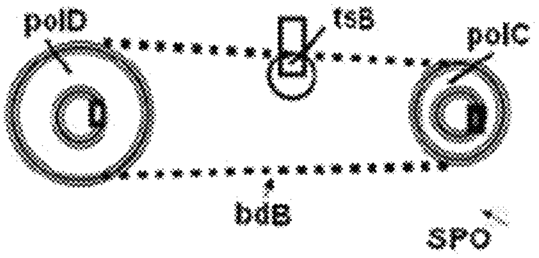
Figura 24
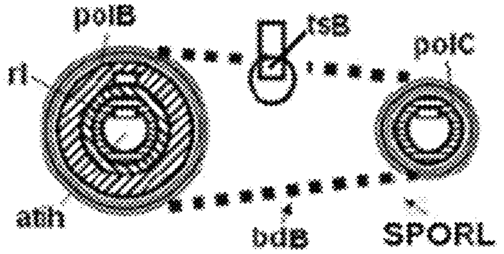
Figura 25
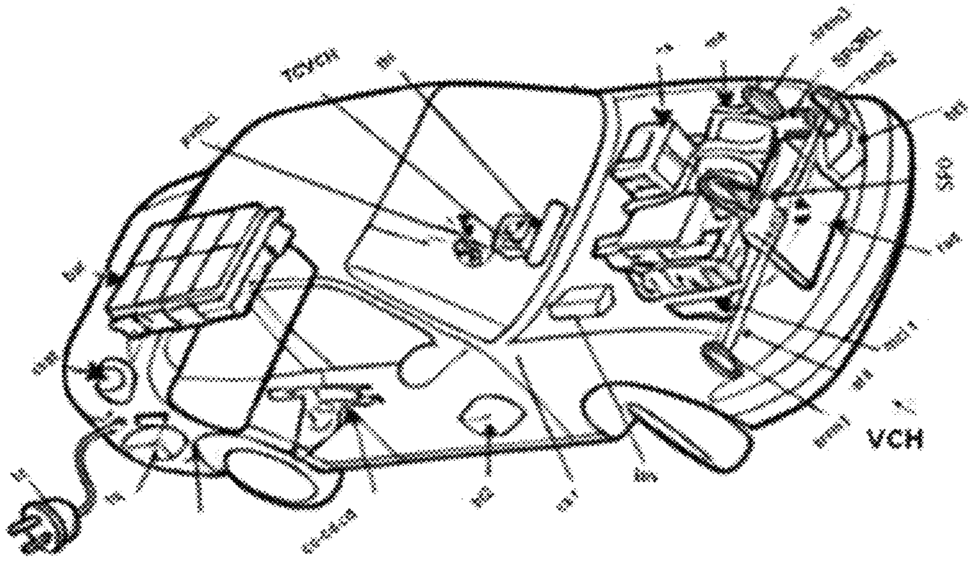
Figura 26 figura 27
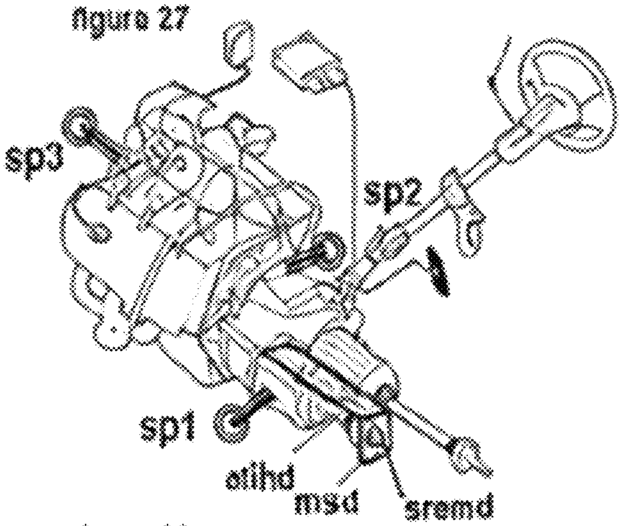
figura 29
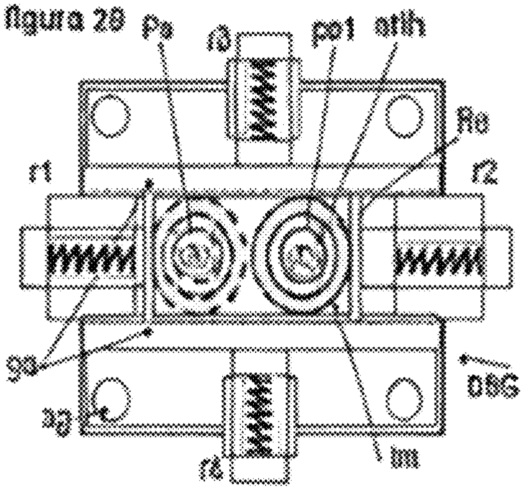
figura 28
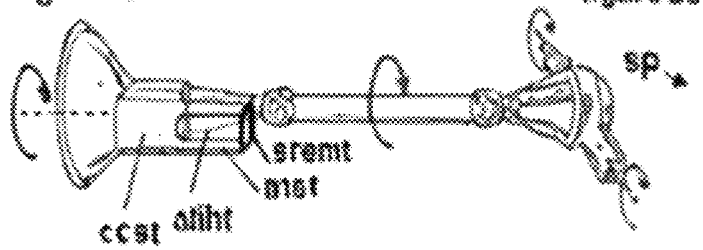
figura 30
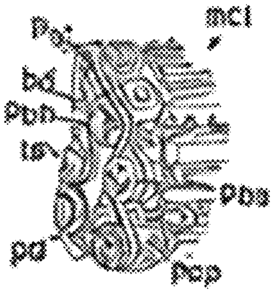

METHOD FOR INTEGRATING AN ELECTRIC DRIVE SYSTEM IN A VEHICLE WITH AN INTERNAL COMBUSTION ENGINE DRIVE SYSTEM USING THE GEARBOX TO CONVERT IT INTO A HYBRID VEHICLE

FIELD OF INVENTION

The present invention, as expressed in the statement of this report, refers to vehicles that must have integrated for their drivers: an internal combustion engine and an electric motor—in the automotive context—this means, that the converted car is moved by both an electric motor and an internal combustion engine. Two driver systems can work independently or simultaneously to rotate the drive wheels to reduce polluting emissions and save energy costs per traveled kilometer compared to vehicles that only have internal combustion engines.

OBJECTIVE OF THE INVENTION

The invention has the following objectives:

1. Reduction or elimination of polluting emissions into the atmosphere in transfers in which traffic density significantly reduces the average speed up to almost one revolution of the wheel.
2. Reduction or elimination of energy consumption in frequent stops that cause the vehicle cannot move due to traffic density.
3. Optimize the space available in a Vehicle with a Propulsion System with an Internal Combustion Engine so that the Electric Propulsion System can be integrated to convert it into a Hybrid Vehicles with an Internal Combustion Engine Propulsion System have an efficiency of 25%, with losses: through the cooling system at 33%, through exhaust pipes at 31% and losses due to friction at 11% and Vehicles with an Electric Propulsion System have an efficiency of up to 95%.

The objectives are achieved, according to the invention, using the characteristics indicated in the claim.

BACKGROUND

Due to the problems that electric vehicles have, the limited energy currently obtained from batteries and their limitation in terms of speed, autonomy, and prohibitive cost, hybrid cars are the ones that offer a more satisfactory compromise solution.

"Hybrid" cars are those that use an electric motor and an internal combustion engine to do their jobs. By using the combustion engine to recharge the batteries, fewer batteries are needed, so the overall vehicle's weight is lower as the combustion engine is usually small.

Hybrid vehicles are equipped with internal combustion engines, designed to operate at maximum efficiency. If more power is generated than necessary, the electric motor is used as a generator and charges the system's batteries. In other situations, only the electric motor operates, feeding on the energy stored in the battery. In some hybrids, it is possible to recover kinetic energy when braking, which is usually dissipated as heat in the brakes, converting it into electrical energy. These types of brakes are often called regenerative.

There are 3 known hybrid propulsion systems for vehicles:

1) Serial hybrid. In these models, the traction is always electric. The combustion engine (also called thermal)

has no mechanical connection to the wheels, it is only used to generate electricity, either by charging the batteries or supplying the power directly to the electric motor.

2) Parallel hybrid. In this case, the heat engine is the main source of energy. The electric motor acts as a backup to the system, providing more power when the system needs it.

3) Combined hybrid: This type of vehicle allows you to operate in both gasoline and electric mode or a combination of both. The electric motor works alone at low speeds, especially over short distances.

At higher speeds, the combustion engine and electric motor work at the same time. This mode combines the fuel economy and low emission benefits of a series hybrid with the acceleration of a parallel hybrid Apart from this general classification, we find another type of car: plug-in hybrids (PHEV). Unlike conventional hybrids, these vehicles can recharge the batteries by connecting to the power grid.

Therefore, they can also be classified according to the charge of the batteries:

a). Regular: They are recharged by the normal operation of the vehicle b). Plug-ins can be recharged by connecting to the mains.

BRIEF DESCRIPTION OF THE FIGURES

A fuller understanding of the invention may be obtained by reference to the accompanying drawings, when considered in conjunction with the subsequent detailed description. The embodiments illustrated in the drawings are intended only to exemplify the invention and should not be construed as limiting the invention to the illustrated embodiments, in which:

FIG. 1, Vehicle with Electric Propulsion System

FIG. 2, Basic components of an Electric Propulsion System

FIG. 3, Vehicle with internal combustion engine propulsion system

FIG. 4, Perspective of the integration Internal Combustion Engine and Electric Motor or geared motor through the modified intermediate shaft of the gearbox to convert the vehicle into a hybrid.

FIG. 5, Ignited Control panel of the vehicle-turned-hybrid.

FIG. 6, Electrical ignition diagram of the vehicle converted to hybrid.

FIG. 7, Electrical diagram of the automatic control to monitor the rpm of the pulley mounted on the front or rear drive hybrid intermediate driveshaft to automatically switch from one propulsion system to another.

FIG. 8, Hybrid Converted Vehicle Accelerator Pedal Integrating Through A Bolt Slot Mechanism Between the Accelerator Pedal Of the Internal Combustion Engine And the Accelerator Pedal Of the Electric Motor Or Both Pedals Are Fixed Parallel FIG. 9, Clutch Pedal perspective integrated with an actuator so that it can function as a vehicle converted to a hybrid.

FIG. 10, Perspective of the integration of the internal combustion engine and electric motor or geared motor through the gearbox using the modified intermediate shaft and an actuator on the gear lever to operate as a hybrid vehicle using a pulley system FIG. 11, In addition to FIG. (10), the perspective of a magnetic clutch and support bearing installed at the end of the intermediate shaft modified to reduce bending, mounted on a support element.

FIG. 15, Perspective of a vehicle with a conventional front-wheel drive internal combustion engine propulsion system.

FIG. 16, Perspective of a front-wheel drive internal combustion engine propulsion system with an actuator connected to the pedal for the conventional clutch and the modification of the gearbox's intermediate driveshaft, increasing its length at one end outward from the housing.

FIG. 17, Perspective of integration of an electric propulsion system to a front-wheel drive internal combustion engine propulsion system connected via the modified intermediate driveshaft of the gearbox, with a pulley system.

FIG. 18, Perspective of integration of an electric propulsion system to a front-wheel drive internal combustion engine propulsion system connected via the modified intermediate driveshaft of the gearbox, with a support bearing assembled on a support element, using an auxiliary driveshaft with 2 pulley system.

FIG. 19, Perspective of the internal components of a conventional longitudinal internal combustion engine propulsion system with rear-wheel drive, with cardan joints, cardan shaft and differential.

FIG. 20, Perspective of the Longitudinal Internal Combustion Engine Propulsion System with the modification of the intermediate driveshaft.

FIG. 21, Perspective of a rear-wheel drive Hybrid Converted Vehicle with 2 intermediate axles or countershafts (main box and auxiliary box) with 2 electric motors.

FIG. 22, Perspective of integrating a propulsion system from electric to a the modified intermediate transmission shaft of the gearbox, with a pulley system, and with a support bearing installed in a support frame.

FIG. 23, perspective of integration of an electric propulsion system to a rear-wheel drive internal combustion engine propulsion system connected via the modified intermediate driveshaft of the gearbox, with a support bearing assembled on a support element, using an auxiliary driveshaft with double pulley system for each driveshaft.

FIG. 24, perspective of the belt pulley transmission system and its tensioner.

FIG. 25, Perspective of the belt pulley transmission system and its tensioner integrating a free wheel into one of the pulleys, which is mounted on the intermediate driveshaft or countershaft of the gearbox, modified in length.

FIG. 26, Perspective of a Converted Vehicle to a Front-Wheel drive Hybrid.

FIG. 27, Perspective of front-wheel drive internal combustion engine propulsion system with modified intermediate shaft, its pulley and support bearing attached to the support element; installed inside the body of the vehicle, in addition to its brackets (sp1), (sp2) and (sp3) that are suitable to move the motor in the X, Y, Z axes.

FIG. 28, Perspective of rear-wheel drive engine propulsion system with modified intermediate shaft with bearing for support attached to a support element; This is installed inside the body of the vehicle.

FIG. 29, Perspective of a damping clamping system for the bearing mounted on the modified intermediate or counter-shaft driveshaft.

FIG. 30, perspective of an Internal Combustion Engine Pulley System.

DETAILED DESCRIPTION OF THE INVENTION

Figure 12:
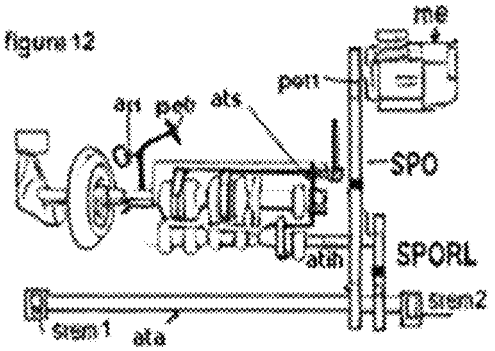
FIG. 12, Perspective of the integration of internal combustion engine and electric motor or geared motor through the gearbox using the modified intermediate shaft to make hybrid with an actuator on the gear lever to operate as a hybrid vehicle and using an auxiliary driveshaft with a pulley system (SPO) and (SPORL)
Figure 14:
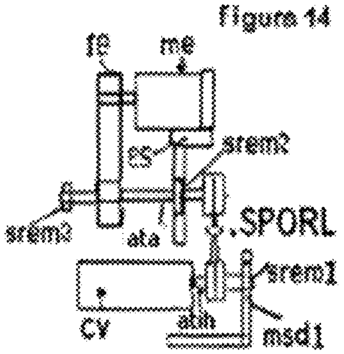
FIG. 14 is a perspective of an electric motor or motor and gearbox connected to an auxiliary driveshaft installed on a support element attached to the body or housing of the internal combustion engine propulsion system with its respective drive pulleys and tensioners of the entire mechanical assembly to connect to the modified intermediate driveshaft of the gearbox.
Figure 13:
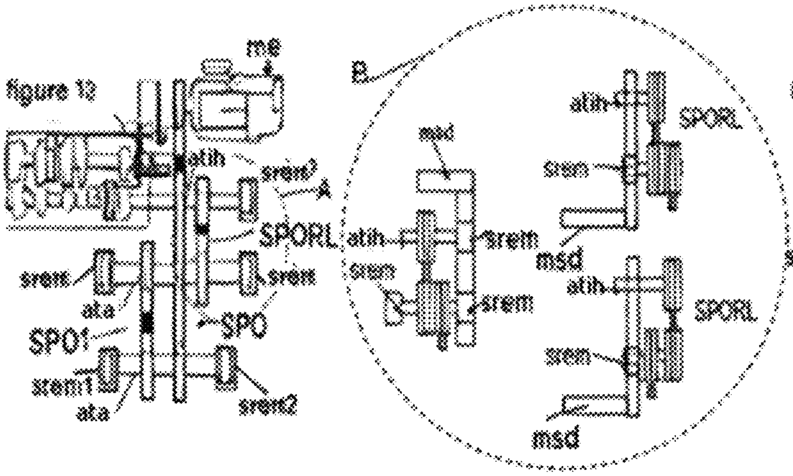
FIG. 13, In addition to FIG. (12), a modified intermediate shaft and bearing is installed to reduce bending, see designs in circle figure (A and B)
Figure 14A:
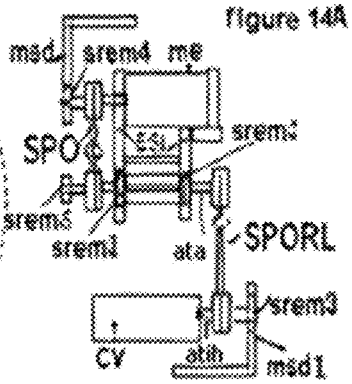
FIG. 14A, This diagram differs from the previous one because it does not use a speed reducer and the support bearings with their support frames are visualized.

The present invention refers to the method of integrating an electric drive system (SPE) FIG. (2) in a Vehicle with a drive System with Internal Combustion Engine (VSPMCI) FIG. (3) or (19) to transform it into a Converted Vehicle Hybrid (VCH) FIG. (21) or (26), and is based on an Electric Propulsion System (SPE) available for installation, configured based on the weight, autonomy and speed required for the conversion of the Vehicle with drive System with Internal Combustion Engine (SPMCI) FIG. (3) or (15) or (19).

The Hybrid Converted Vehicle (VCH) can operate as if it were a conventional Vehicle with Electric Propulsion System (VSPE), FIG. 1), or as if it were a conventional Vehicle with Internal Combustion Engine Propulsion System (VSPMCI) and alternate between the propulsion systems or may operate simultaneously using both propulsion systems while the actuator (act) is deactivated.

The Hybrid Converted Vehicle is based on 2 types of Internal Combustion Engine (ICM)

1. Transverse internal combustion engine (mcit) FIG. (3) has the crankshaft (cg) FIG. (4) parallel to the axis of the tires (llt) FIG. (3)
2. Longitudinal internal combustion engine (mcil) FIG. 19) having the crankshaft (cg) FIG. 4) perpendicular to the axis of the tires (11*t*) FIG. 3)

These Vehicles with Internal Combustion Engine Propulsion System are front-wheel drive FIG. (3) or rear-wheel drive FIG. (21)

Both engines (mcit) and (mcil) are connected with a clutch (Eb) FIG. 3) with a gearbox (cv) FIG. (4) or (15) or (19) that contains an input transmission shaft (ate) FIG. (4) or (15) or (19), an intermediate transmission shaft or countershaft (ati) (4) or (15) or (19)—there are gearboxes with up to 2 countershafts-, and an output transmission shaft (ats) (4) or (15) or (19) that is responsible for changing to different speeds by means of a gear lever (pvmci), the integration method of an Electric Propulsion System (SPE) in vehicles with a Propulsion System with Internal Combustion Engine (SPMCI) to transform it into a Hybrid Converted Vehicle (VCH) is done by increasing the length of the intermediate transmission shaft (ati) out of the casing, in 2 ways:

1. Mechanically integrating into the end of the intermediate drive shaft (ati)
   a revolution or other section extension—not shown—to increase its length
2. An intermediate drive shaft or (ati) of greater length at the end.

To identify the above modification, it will be called hybrid intermediate drive shaft (atih); It can be front (atihd) or rear (atiht), and to assemble the hybrid intermediate transmission shaft (atih) a hole is machined—not shown—in the housing (ccs) of the gearbox (cv) where the end of the intermediate transmission shaft (ati) is located and in the housing hole (ccs) a suitable bearing is installed—not shown—and a seal—not shown—, and that extension of the intermediate transmission shaft (ati) is used to mount a universal coupling (cp) FIG. (4) or pulley (pol) FIG. (16), if required, the supports (sp1), (sp2) and (sp3) FIG. (27) that Supporting the motor (mci) can be adapted so that the motor moves in the X, Y, and Z axes to give more space for the installation of the coupling (cp) or pulley system (SPORL).

It should be noted that the mechanical elements, both the universal coupling (pc) and the pulley (polB) are those that can mechanically connect the electric motor (me) or gear motor—not shown—, to thus integrate the Electric Propulsion System (SPE).) in a Vehicle with a conventional Internal Combustion Engine Propulsion System (VSPMCI).

On the other hand, the output transmission shaft (ats) in FIG. (4) can also be used for this purpose; but, making a modification in a similar way to the intermediate transmission shaft (ati); However, when the option (SPE) is selected—by using either of the 2 trees (ati) or (ats)—through the Electric Vehicle Control Board (TCVCH) FIG. (5), an actuator is instantly activated. (act) FIG. (9) to pull the clutch pedal (peb) to disengage the internal combustion engine (mci) from the gearbox (cv).

The Converted Hybrid Vehicle (VCH) FIG. (26) is connected according to the Electrical Diagram of the Converted Hybrid Vehicle (DEVCH) FIG. (6) and operates through the Control Board of the Converted Hybrid Vehicle (TCVCH) FIG. (5) and It starts by activating the Powertrain Switch (ISM) to pass current from the battery that may be located in different spaces of the vehicle such as (bt1) or (bt2) or (bt3) to the Hybrid System Switch (ISH) and with it select the option in which the Hybrid Converted Vehicle (VCH) is required to operate between the Electric Propulsion System (SPE) or Internal Combustion Engine Propulsion System (SPMCI).

The ignition and gear change method of the Hybrid Converted Vehicle (VCH) is carried out for 2 operating modes:

1. Electric Propulsion System (SPE)
2. Internal Combustion Engine Propulsion System (SPMCI)

In case 1, by letting the electric current from the battery (12V or other) pass through the Powertrain Switch (ISM) to the Hybrid System Switch (ISH) FIG. (5) and with it selecting the Electric Propulsion System (SPE), simultaneously the actuator (act) is activated to pull the clutch pedal (peb) FIG. (9) or, if applicable, the magnetic clutch (Em) FIG. (11) is activated to disengage the internal combustion engine (mci) of the gearbox (cv) FIG. (15) to then activate the Switch of the electric Propulsion System (ISPE) FIG. (5) or the key (ks) FIG. (2) to turn on—let the electric current pass—of the battery that can be located in position (bt1) or (bt2) or (bt3) FIG. 26) of 12V to activate a contactor—not shown—or another, whose function is to let the current from the battery bank (bat) pass to the electronic control (ce) and this to the electric motor (me) or gear motor (re)—not shown—, and since the internal combustion engine (mci) is disengaged from the gearbox (cv), the gear lever (pvmci) can be moved from the neutral position—not shown—to the 1st gear position—not shown—and begin to press the Accelerator Pedal of the Hybrid Converted Vehicle (PAVCH) FIG. (8) to move the Hybrid Converted Vehicle (VCH), and to make another speed change, release or press remove your foot from the Accelerator Pedal of the Hybrid Converted Vehicle (PAVCH), leaving the vehicle inertia and as the internal combustion engine (mci) is disengaged from the gearbox (cv) by the action of the actuator (act), the You can move the internal combustion engine (PVMCI) gear lever from the 1st position. Speed, —not shown—, at 2nd speed position—not shown—, and press the Accelerator Pedal of the Hybrid Converted Vehicle (PAVCH) again to move the Hybrid Converted Vehicle (VCH) in another speed and so on.

In case 2, by passing the electrical current from the Powertrain Switch (ISM) to the Hybrid System Switch (ISH) FIG. (5) and selecting to start the vehicle with the Internal Combustion Engine Propulsion System (SPMCI) FIG. (15), simultaneously the actuator (act) is activated to release the clutch pedal (peb) FIG. (9) or, where 7 appropriate, the magnetic clutch (Em) or another is activated, to be able to engage the internal combustion engine (mci). FIG. (15) with the gearbox (cv) and can be turned on with the Internal Combustion Engine Propulsion System Switch (ISPMCD) FIG. (5) or the key (sw) FIG. (3) to pass electric current from the battery (bt) to rotate the electric starter motor (ma) FIG. (3) and a solenoid (sl) FIG. (3) that sends electric current to the spark plugs (bj) FIG. (3) to start the ignition to generate thermal energy to move the piston (pt) FIG. (4) and the connecting rod (bi) FIG. (4) to rotate the crankshaft (cg) FIG. (4) which has a damper pulley mounted (pd) FIGS. (3) and (30) and through of the belt (bd) transmits power to a system of pulleys (sp) FIG. (30), among which is the alternator pulley (Pat) FIG. (3) which, when rotating, generates electrical energy to continue with the ignition system of continuously and simultaneously recharges the battery (bt) and disconnects the starter motor (ma), leaving the internal combustion engine (mci) ignition, and having the internal combustion engine (mci) engaged with the gearbox (cv), the clutch pedal (peb) must be pressed to disengage the internal combustion engine (mci) FIG. (15) of the gearbox (cv) and then move the gear lever (pvmci) from neutral position—not shown—to 1st speed position—not shown—and release the pressure or remove the clutch pedal (peb) to engage the internal combustion engine (mci) with the gearbox (cv) and begin to press the Accelerator Pedal of the Converted Hybrid Vehicle (PAVCH) to move the vehicle, and to make another speed change the pedal must be pressed for the clutch (peb) to disengage the internal combustion engine (mci) from the gearbox (cv) and then move the gear lever (pvmci) from the 1st speed position—not shown—to the 2nd speed position—not shown—and stop pressing the clutch pedal (peb) to engage the internal combustion engine (mci) with the gearbox (cv) and begin to press the accelerator pedal. Hybrid Converted Vehicle (PAVCH) to move the Hybrid Converted Vehicle (VCH) at another speed.

In the Converted Hybrid Vehicle (VCH) to move the gear lever (pvmci) to the reverse speed position—not shown—it must only be done with the Converted Hybrid Vehicle (VCH) without movement and without pressing the Pedal. Accelerator Vehicle Converted Hybrid (PAVCH); in both (SPE) or (SPMCI) mode.

Charging the batteries (bt) and (bat) in the Converted Hybrid vehicle is done in 2 ways:

1. Propulsion System with Internal Combustion Engine (SPMCI), occurs because the alternator (at) has the capacity to generate electrical energy to provide charge to the battery (bt), to the solenoid (sl) that powers the spark plugs (bj) and other accessories—not shown—, and in case the energy is not used because: it is daytime, it is not raining, the radio is not used—not shown—, that energy is directed to charge the bank of batteries (bat), connecting an inverter (inv) FIG. (26) between the battery (bt) and the high voltage battery charger (cbat) and this is connected to the battery bank (bat).

2. Propulsion System (SPE), the charging of the high-voltage batteries (bat) is through braking and deceleration due to the effect of regenerative braking; It is also possible to use the battery charger (cbat) with a plug (tc) connected to a power outlet—not shown—, and the accessories of the Converted Hybrid Vehicle (VCH) that use low voltage of 12V, a converter is used. high voltage direct current to low voltage direct current (co-dc-dc), and this can also be used to recharge low voltage batteries (bt)

Therefore, the Hybrid Converted Vehicle (VCH) works the same as a Vehicle with Electric Propulsion System (VSPE) FIG. (1) and works the same as a Vehicle with Internal Combustion Engine Propulsion System (VSPMCI) FIG. (3) independently between propulsion systems. FIG. (6) shows the basic Electrical Diagram of the Vehicle Converted to Hybrid (DEVCH).

In FIG. 7), the Propulsion System Automatic Change System (SCASP) is shown through an encoder—not shown—to monitor the rpm of the pulley (polB) mounted on the hybrid intermediate transmission shaft (atih) FIG. (12), and according to the rpm configured in the program, the signal is sent to a (plc)—not shown—turns on the Electric Propulsion System (SPE) and turns off the Engine Propulsion System. Internal Combustion (SPMCI).

FIG. (8) represents the perspective of an Accelerator Pedal for a Hybrid Converted Vehicle (PAVCH) that consists of articulating the accelerator pedal for the electric motor (Pame) and the accelerator pedal for the internal combustion engine (pamci).) through a hinge mechanism with slot and sliding bolt (brpd) and that when pressing the Accelerator Pedal for Hybrid Converted Vehicle (PAVCH) both move simultaneously, the pedal (pame) is fixed on the floor of the vehicle with Its articulation mechanism (ma) and pedal (pamci) are left in the same place as it is installed.

FIG. (9) represents the perspective of a clutch pedal (peb) of a Vehicle with a conventional Internal Combustion Engine Propulsion System (VSPMCI) connected to the actuator (act) that is only activated when selecting the electric Propulsion System. (SPE) through the Hybrid System Switch (ISH) immediately the actuator (act) pulls the clutch pedal (peb) to disengage the internal combustion engine (mci) from the gearbox (cv) and can start the Hybrid Converted Vehicle (VCH) with Switch Electric Propulsion System (ISPE); However, the actuator (act) does not push the clutch pedal (peb) because it is not articulated for that purpose, but rather it will be pushed by the spring—not shown—that is integrated from the factory.

In FIG. (10), in addition to what is represented in FIG. (4), instead of the universal coupling (pc), a pulley system (SPORL) is mounted that mechanically connects to the electric motor (me) or geared motor—not shown. represents—with the hybrid intermediate transmission shaft (atih), the modification of this shaft is important so that it can be adapted for reasons of space—or obstacles from other components—the Electric Propulsion System (SPE) in Vehicles with Internal Combustion Engine Propulsion (VSPMCI) of origin, the use of the pulleys (SPORL) is to optimize and use the limited space available in such a way that all possible components are installed obtaining a Hybrid Converted Vehicle (VCH) FIG. (26) unlike other methods of conversions from Vehicles with Internal Combustion Engine Propulsion System (VSPMCI) to Hybrid Converted Vehicle (VCH)

In FIG. (11), in addition to FIG. (10), a support bearing (srem) is shown at the end of the front hybrid intermediate transmission shaft (atihd) to reduce bending; it is mounted on a support element (mst). FIG. (27), and the support element (mst) is assembled in the internal combustion engine casing (mci) or gearbox casing (cv) or in the body of the vehicle.

FIG. (12) represents an electric motor (me) or gear motor—not shown—connected to an auxiliary transmission shaft (ata) through a pulley system (SPO), which is supported by the bearings (sreml).) and (srem2) and has another pulley system (SPORL) installed, which is mechanically connected to the hybrid intermediate transmission shaft (atih) and considering that in the pulley system (SPORL) FIG. (25) there is the pulley (polB) that has a free wheel (r1) installed to transmit in only one direction and allows the electric Propulsion System to be mechanically disconnected to obtain greater energy efficiency, leaving only the Propulsion System with internal combustion engine (SPMCI) operating.

In FIG. (13), in addition to what is represented in FIG. (12), a bearing (srem3) is mounted at the end of the hybrid intermediate transmission shaft (atih) FIG. (16) to reduce flexures, this bearing (srem3) It is mounted on a support element (MSD) and the support is assembled on the outer body of the internal combustion engine (MCI) or casing (CCS) of the gearbox (cv) FIG. (27), also for this diagram it is additionally visualizes FIG. (12), the installation of an auxiliary transmission shaft (ata1) with its pair of bearings (srem4) and (srem5) that is mechanically connected with the auxiliary transmission shaft (ata) through a system of pulleys (SPOI) at the same time it is mechanically connected to the hybrid intermediate transmission shaft (atih) of the gearbox (cv), this is for cases in which there is a lack of space or obstacles that prevent the mechanical connection between the propulsion systems (SPE) and (SPMCI), see 4 mechanism designs (dotted circle A and B)

In FIG. (14), it is a diagram with an electric motor (me) mechanically connected to a speed reducer (re) to which an auxiliary transmission shaft (ata) is mechanically connected, which is installed in a support element (ES). with bearing (srem2), and this is mechanically connected through a pulley system (SPORL) with the hybrid intermediate transmission shaft (atih) of the gearbox (cv). This scheme is used in case there are obstacles that prevent the direct mechanical connection between the electric motor shaft (me) and the hybrid intermediate drive shaft (atih).

In FIG. (14A), in this diagram with an electric motor (me) that is mechanically connected to an auxiliary transmission shaft (ata) installed in an integral support element (ESI) that has two bearings (srem1) and (srem2) through a pulley system (SPO), at the same time this is mechanically connected through a pulley system (SPORL) with the hybrid intermediate transmission shaft (atih) of the gearbox (cv). This scheme is used in case there are obstacles that prevent the direct mechanical connection between the electric motor shaft (me) and the hybrid intermediate drive shaft (atih).

FIG. (15) shows the perspective of a conventional front-wheel drive Internal Combustion Engine Propulsion System (SPMCI).

FIG. (16) shows the integration of the front hybrid intermediate transmission shaft (atihd) with the pulley (polB) mounted and the actuator (act) articulated only for pulling; but, not to mechanically push the clutch pedal (peb)

FIG. (17) shows the integration of an electric motor (me) or geared motor that is mechanically connected to the front hybrid intermediate transmission shaft (atihd) through a pulley system (SPORL FIG. (18) shows an electric motor (me) that is mechanically connected to the auxiliary transmission shaft (ata) with its pair of mounted bearings (srem1) and (srem2), through a pulley system (SPO). In turn, this auxiliary transmission shaft (ata) is mechanically connected to the front hybrid intermediate transmission shaft (atihd) through a pulley system (SPORL), in this diagram a support bearing (srem3) is visualized in the front hybrid intermediate driveshaft end (atihd) to reduce bending, mounted on a support element FIG. (27)

FIG. (19) shows the interior part of the Propulsion System with Internal Combustion Engine (SPMCI) of FIG. (21) with a longitudinal internal combustion engine (mcil), gearbox (cv) that is generally composed 3 transmission shafts: the input transmission shaft (ate) which is mechanically connected to the intermediate transmission shaft (ati) and is mechanically connected to the output transmission shaft (ats) which is responsible for changing the different speeds, for example means of a gear lever (pvmci)—not shown—, FIG. (20) displays the modification in the length of the intermediate transmission shaft (ati) to be able to mount a universal coupling (cp) or pulley (polB), because it is through this modification that the Propulsion System is mechanically connected. Electric (SPE) in a Vehicle with Conventional Longitudinal Internal Combustion Engine Propulsion System (VSPMCI) to convert it into a Hybrid Converted Vehicle (VCH)

FIG. (21) shows the perspective of the rear-wheel drive Hybrid Converted Vehicle (VCH) with speed box (cv) with 2 countershafts (main and auxiliary box) connected to 2 electric motors (me). FIG. (22) visualizes the integration of an electric propulsion system (SPE) in a conventional longitudinal Internal Combustion Engine Propulsion System (SPMCI) through the modification of the intermediate transmission shaft (ati) in its length to mount a system of pulleys (SPORL) mechanically connected between the transmission shaft of the electric motor (me) or geared motor—not shown—, and the modified intermediate transmission shaft (ati), and to differentiate it it will be identified as the intermediate transmission shaft rear hybrid (atiht) because it is through this that the Electric Propulsion System (SPE) can be adapted to optimize the limited space available in such a way that all possible components are installed, obtaining a Hybrid Converted Vehicle (VCH) with rear-wheel drive, a rear bearing (sremt) is also mounted for support at the end of the rear hybrid intermediate drive shaft (atiht) to reduce flexing, this bearing (sremt) is installed in a support element (mst) assembled within the vehicle, in the same way a support bearing (srem3) can be installed to the transmission shaft of the electric motor (me) assembled in a type support element (msd) FIG. (14A) to avoid bending FIG. (24) shows a pulley system (SPO) for power transmission that is composed of the pulley (polC), its band (bdB), its tensioner (tsb) and the pulley (polD).

FIG. (25) displays a pulley system (SPORL) for transmission that is composed of the pulley (polC), its band (bdB), its tensioner (tsb) and the pulley (polB) that has a free wheel installed (r1), this pulley (polB) is mounted to the hybrid intermediate transmission shaft (atih)

FIG. 29 shows a guide clamping device (dsg) for bearing (re) with an elastomer jacket (lm) that is mounted on the hybrid intermediate transmission shaft (atih), held with 4 springs (r1, r2, r3 and r4) graduated to maintain in balance both in the point position (ps) or the point (ps1) mounted on grooved guides (ga) for the change in position that occurs when the internal combustion engine (mci) is accelerated and installs through the holes (ag) in the internal body of the Hybrid Converted Vehicle. between the electric motor shaft (me) and the hybrid intermediate drive shaft (atih)

In the descriptive memory, typical illustrative embodiments of the invention have been described and, although specific terms are used, they are used in a generic and descriptive sense only and not for purposes of limitation.

Obviously many modifications and variations of the invention are possible in light of the above teachings. Therefore, it should be understood that the invention may be practiced other than as specifically described.

What is claimed is:

1. A method to convert vehicles with driver system with internal combustion engine comprising: a gearbox, a clutch, an alternator, an accelerator pedal, a clutch pedal, and a battery to hybrid by adapting components of an electric propulsion system, the method includes:

installing an electric motor through rotating a gearbox transmission shaft;

installing a high voltage battery bank configured to provide power to the electric motor;

installing an electronic control configured to control the amount of current supplied from the high voltage battery bank to the electric motor; and removing the gearbox in a vehicle before conversion to a hybrid vehicle, the gearbox is removed to modify the intermediate drive shaft or countershaft connected inside the gearbox to the input drive shaft and the output propeller shaft;

wherein the length of the intermediate drive transmission shaft is increased at one end in such a way that it passes out of the casing of the gearbox so that through this increase in length that comes out of the casing the electric motor can be mechanically connected, using a universal coupling or pulleys, an auxiliary transmission shaft and bearings; and wherein at least one intermediate drive shaft of the gearbox is replaced by one of greater length at one end and said intermediate drive shaft passes out through the casing of the gearbox.

2. The method according to claim 1, characterized in that it comprises removing the battery for relocation to the body of the vehicle and attaching at that location a mounting clamp for the electric motor.

3. The method according to claim 2, characterized in that it comprises the installation of at least one electric motor or gear motor.

4. The method according to claim 2, characterized in that it also comprises relocating, where appropriate, the fuse box, cables and hoses of the propulsion system with internal combustion engine in such a way that they allow the components of the electric propulsion system to be installed.

5. The method according to claim 1, characterized in that it comprises, where appropriate, adapting motor supports so that they allow the motor to move in the X, Y, and Z axes, in such a way that the installation of the components of the electric propulsion system is allowed.

6. The method according to claim 1, characterized in that, where appropriate, an extension is mechanically installed to increase the length of the end of the intermediate transmission shaft.

7. The method according to claim 6, characterized in that, where appropriate, the output transmission shaft can also be used with the same modifications for the conversion of the vehicle to hybrid.

8. The method according to claim 7, characterized in that at the step of coupling an output shaft of the electric motor to an end that is opposite to the gearbox by the universal coupling comprises coupling the output shaft of the electric motor to a modified intermediate drive shaft.

9. The method according to claim 8, characterized in that it comprises, where appropriate, installing a pulley system, one mounted at the end of the modified intermediate drive shaft and the other on the electric motor.

10. The method according to claim 9, characterized in that, where appropriate, pulley systems are installed and an auxiliary transmission shaft is mounted between the modified intermediate drive shaft and the electric motor to allow the installation of the components of the electric propulsion system.

11. The method according to claim 10, characterized in that in case a pulley system is installed, at least one auxiliary transmission shaft is installed between the modified intermediate drive shaft and the electric motor.

12. The method according to claim 11, characterized in that at least one pulley system is installed for each auxiliary transmission shaft.

13. The method according to claim 9, characterized in that in case of installing a pulley system, where appropriate, a pulley may include a freewheel.

14. The method according to claim 13, characterized in that a suitable support bearing is mounted on the modified intermediate drive shaft, this being installed in a support element.

15. The method according to claim 14, characterized in that in the case of not using a suitable support bearing, a Guide Fastening Device with a suitable bearing is installed in case of misalignment of the modified intermediate drive shaft, the Guide Fastening Device being configured to absorb movements caused by accelerating the internal combustion engine.

16. The method according to claim 9, characterized in that a suitable support bearing is installed on the shaft of the electric motor, if applicable, and this is mounted on a support element.

17. The method according to claim 1, further comprising installing a hybrid converted vehicle control board to select between the electric propulsion system or the internal combustion engine propulsion system.

18. The method according to claim 1, further comprising installing an instrument panel to monitor the operating parameters of the electric propulsion system.

19. The method according to claim 1, characterized in that an actuator is installed that mechanically articulates only to pull the clutch pedal and is activated by a signal from a hybrid converted vehicle control board.

20. The method according to claim 1, characterized in that it comprises installing a co-DC-DC direct current high to low voltage converter.

21. The method according to claim 1, characterized in that it further comprises the installation of a battery charger inside the vehicle that allows charging the high voltage battery when the vehicle is not in use.

22. The method according to claim 21, characterized in that an inverter is installed between the battery and the battery charger to take advantage of the energy generated by the alternator to charge the high voltage battery.

23. The method according to claim 1, characterized in that it comprises the installation of an accelerator pedal for a hybrid converted vehicle that mechanically articulates a pedal for the electric propulsion system and the accelerator pedal for the internal combustion engine through a hinge type mechanism with a slot and a sliding bolt and that when pushing the accelerator pedal for a hybrid converted vehicle, both pedals move simultaneously.

24. The method according to claim 23, characterized in that, where applicable, both articulated pedals are installed in parallel, integrating them into the same accelerator pedal for a hybrid converted vehicle.

25. The method according to claim 1, characterized in that, where appropriate, an Automatic Control System can be installed to change a propulsion system through the RPM configured in said system.

26. The method according to claim 1, characterized in that both propulsion systems can work simultaneously.

27. The method according to claim 1, characterized in that it further comprises the installation of a sensor control system to monitor and control the operating temperature of batteries and other components of the electric propulsion system.

28. The method according to claim 1, characterized in that it further comprises the support elements within the vehicle for holding the components of the electric propulsion system.

29. The method according to claim 1, characterized in that, where appropriate, more than two bearings and pulley systems are installed for each transmission shaft, these can be located interchangeably along each transmission shaft and can be mechanically connected from different points along each transmission shaft to allow the installation of the components of the electric propulsion system.

* * * * *